United States Patent
Collison et al.

(10) Patent No.: US 9,239,105 B2
(45) Date of Patent: Jan. 19, 2016

(54) POWER TRANSMISSION SYSTEM FOR PEOPLE MOVER

(71) Applicant: Kone Corporation, Helsinki (FI)

(72) Inventors: Glen Collison, Aledo, IL (US); Thomas Nurnberg, Council Grove, KS (US)

(73) Assignee: Kone Corporation, Helsinki (FI)

( * ) Notice: Subject to any disclaimer, the term of this patent is extended or adjusted under 35 U.S.C. 154(b) by 145 days.

(21) Appl. No.: 14/051,523

(22) Filed: Oct. 11, 2013

(65) Prior Publication Data

US 2015/0101433 A1    Apr. 16, 2015

(51) Int. Cl.
*B66B 23/02* (2006.01)
*F16H 57/025* (2012.01)
*F16H 57/021* (2012.01)

(52) U.S. Cl.
CPC ............. *F16H 57/025* (2013.01); *B66B 23/02* (2013.01); *F16H 57/021* (2013.01)

(58) Field of Classification Search
CPC .............................. B66B 23/02; F16H 57/025
USPC ......................................... 198/321, 329, 330
See application file for complete search history.

(56) References Cited

U.S. PATENT DOCUMENTS

| | | | | |
|---|---|---|---|---|
| 3,388,513 A | * | 6/1968 | Bauer | 52/65 |
| 4,227,605 A | * | 10/1980 | Hofling | 198/331 |
| 4,775,044 A | * | 10/1988 | Hofling | 198/330 |
| 5,224,580 A | * | 7/1993 | Nurnberg et al. | 198/330 |
| 6,155,401 A | | 12/2000 | Lunardi et al. | |
| 6,342,768 B1 | * | 1/2002 | van der Heiden | 318/39 |
| 6,640,959 B1 | * | 11/2003 | Haumann et al. | 198/331 |
| 6,758,480 B1 | * | 7/2004 | Thiel | 277/630 |
| 6,966,420 B2 | * | 11/2005 | Ackmann et al. | 198/330 |
| 7,168,547 B2 | | 1/2007 | Thaler et al. | |
| 7,597,182 B2 | * | 10/2009 | Illedits et al. | 198/330 |
| 8,042,675 B2 | * | 10/2011 | Gonzalez Alemany et al. | 198/332 |
| 8,381,894 B2 | * | 2/2013 | Nurnberg et al. | 198/330 |
| 8,960,418 B2 | * | 2/2015 | Rathmann et al. | 198/835 |

FOREIGN PATENT DOCUMENTS

WO    WO-2011/011262 A1    1/2011

* cited by examiner

*Primary Examiner* — Douglas Hess
(74) *Attorney, Agent, or Firm* — Venable LLP; Steven J. Schwarz

(57) ABSTRACT

A power transmission system for a people mover, including a transmission housing; a main shaft extending at least partially through the transmission housing for rotation with respect thereto; a plurality of gears located inside the transmission housing, the plurality of gears adapted to rotate the main shaft; and a flexible coupling adapted to secure the transmission housing to a structural support.

18 Claims, 9 Drawing Sheets

US 9,239,105 B2

POWER TRANSMISSION SYSTEM FOR PEOPLE MOVER

TECHNICAL FIELD

This patent application relates generally to people movers, such as escalators and moving walkways. More specifically, this patent application relates to a load-bearing gearbox for people movers.

BACKGROUND

People movers, such as escalators and moving walkways, often include a truss that spans, for example, between different levels in a building. However, in certain applications, the truss may not be required. In either event, when present, the truss supports the weight of the steps, passengers, and other components of the people mover. Typically, the truss also bears the live load of the people mover, e.g., the momentive force that propels the steps and the passengers standing on the steps. For example, in certain embodiments, the main shaft is mounted on the truss at or near the upper end of the truss. The main drive/gearbox then transmits power to the main shaft directly or indirectly. Using the truss to support the main shaft can complicate the installation of the gearbox and/or can limit the possible locations for the gearbox.

SUMMARY

According to an illustrative embodiment, a power transmission system for a people mover comprises a transmission housing; a main shaft extending at least partially through the transmission housing for rotation with respect thereto; a plurality of gears located inside the transmission housing, the plurality of gears adapted to rotate the main shaft; and a flexible coupling adapted to secure the transmission housing to a structural support. Further aspects, objectives, and advantages, as well as the structure and function of exemplary embodiments, will become apparent from a consideration of the description, drawings, and examples.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

This application relates to a power transmission system for a people mover, such as an escalator or moving walkway. According to embodiments, the power transmission system includes a gear box that transmits power from the main drive motor (e.g., an AC or DC electric motor) to the step chain to propel the steps or walkway. The present gear box may be a "load bearing" gearbox. This means that the gearbox itself can support the main shaft and the torque/force load applied on the main shaft by the step chain sprocket that in turn moves the steps and passengers. In contrast to prior power transmission systems, the present gearbox can avoid the need to have the truss support the main shaft, allowing for "trussless" people movers, and/or providing flexibility in the location of the gearbox and main shaft when retrofitting older people movers.

Figure 1:
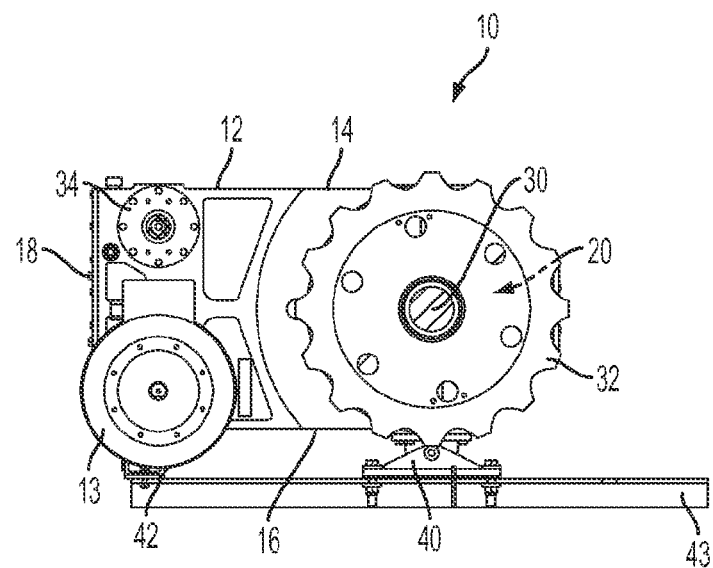
FIG. 1 is side view of an embodiment of a gearbox for a people mover.

Referring to FIG. 1, an embodiment of a gearbox 10 is shown. The gearbox 10 can include a transmission housing 12 that holds and supports the internal components of the gearbox, such as gears, shafts, and bearings, as will be discussed in more detail below. According to a non-limiting embodiment, the transmission housing can be generally rectangular, although other shapes are possible. As shown in FIG. 1, the transmission housing 12 can include an upper wall 14, a lower wall 16, end walls 18, 20, and opposed side walls 22, 24 (labeled in the cross-section of FIG. 2).

Figure 2:
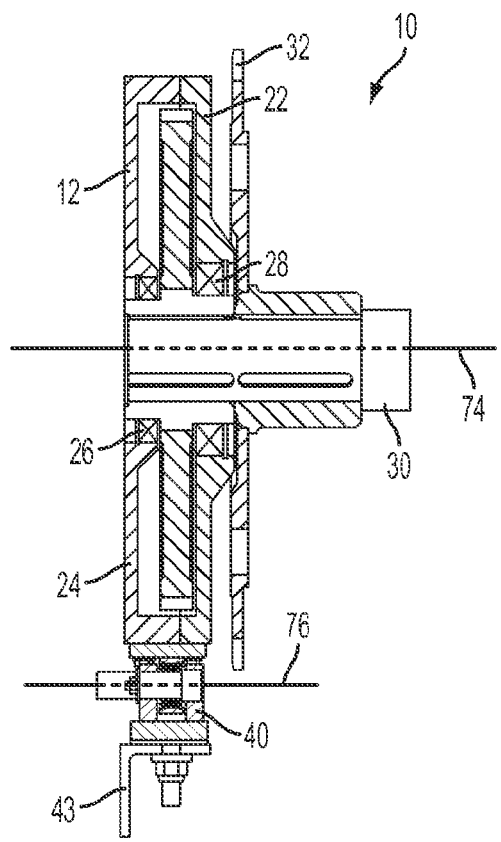
FIG. 2 is a cross-sectional view of the gearbox of FIG. 1.
Figure 13:
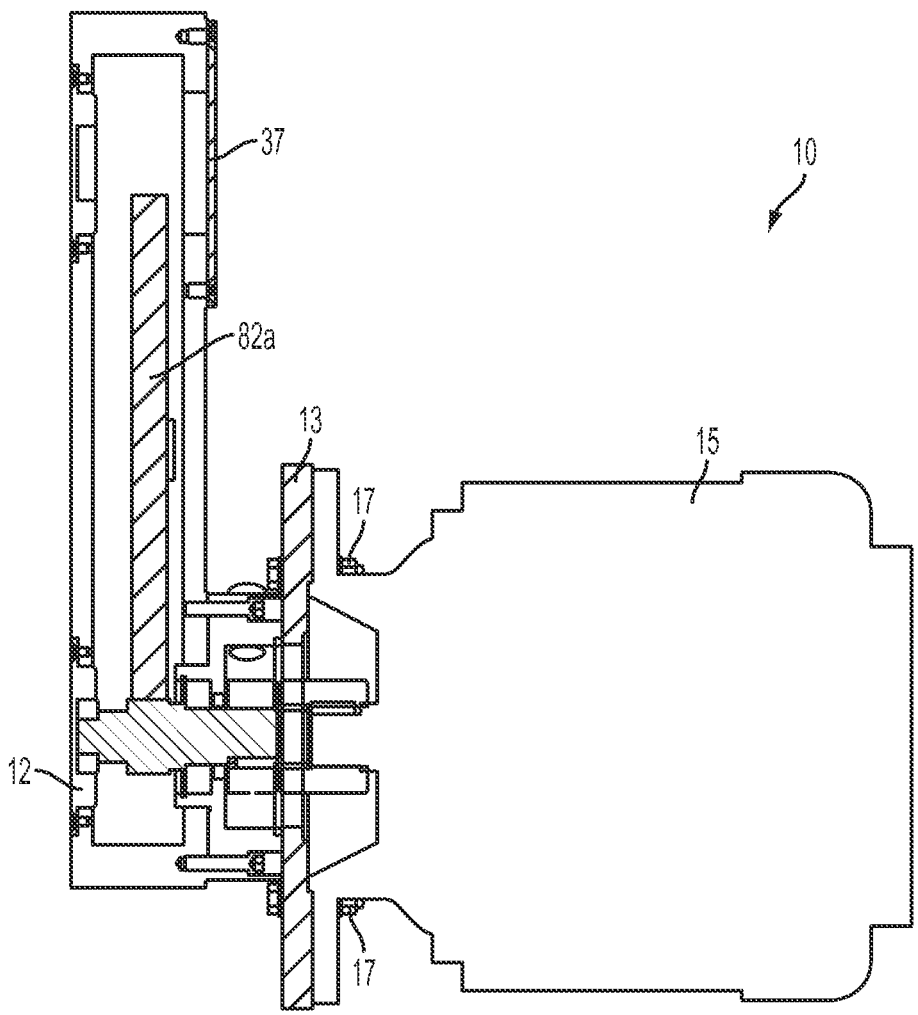
FIG. 13 is a side, cross-sectional view through the gearbox of FIG. 1, shown with an embodiment of a drive motor in place on the motor mount.

Referring to FIGS. 1 and 2, the transmission housing 12 can include a motor mount 13 that supports a main drive motor (e.g., an AC or DC electric motor) on the housing 12. The motor mount 13 can comprise a mounting plate, bores, threaded bores, or other structures known in the art to facilitate securing a main drive motor 15 (see, e.g., FIG. 7) to the transmission housing. FIG. 13 is a cross-sectional view showing an embodiment of the drive motor 15 attached to the motor mount 13 using threaded fasteners 17, however, other embodiments are possible.

Referring back to FIGS. 1 and 2, the transmission housing 12 can also include bearings 26, 28 that support the main shaft 30 on the housing 12, for example, extending transversely through the side walls 22, 24. The main shaft 30 can extend completely or partially through the housing 12. Gears inside the transmission housing 12 can transmit power from the main drive motor 15 to the main shaft 30, as will be described in more detail below. A step chain sprocket 32, or other output gear, can be coupled to the main shaft 30 to drive the steps or pallets of the people mover. In FIG. 1, a brake mount 34 is secured in place on the transmission housing 12, however, the brake mount 34 can alternatively be replaced with a second motor mount 13, or alternatively, the location of the brake mount 34 and motor mount 13 can be reversed. Alternatively, a dust cover 37 can be used in lieu of the brake mount 34, as shown in FIG. 13.

Referring to FIG. 2, the bearings 26, 28 can comprise ball bearings, cylindrical roller bearings, spherical roller bearings, or other types of bearings or bushings known in the art. With further reference to FIG. 2, embodiments of the housing 12 can be adapted to interchangeably mount the main shaft 30 with the output/step chain sprocket 32 on the right-hand side (as shown) or on the left-hand side, thereby lending flexibility to the installation of the gearbox 10.

Referring back to FIG. 1, one or more flexible couplings 40, 42, such as brackets or mounts, can mount the gearbox 10 to a structural support 43, e.g., a concrete floor, structural beam, girder, or other part of the building structure or environment in which the people mover is located. According to embodiments, the structural support 43 can even comprise the truss of an existing people mover that is being refurbished or upgraded.

The flexible couplings can be adapted to flex or otherwise deflect in desired directions, while remaining substantially rigid in other directions, to accommodate for forces and/or torque loads applied to the gearbox 10 during driving of the step band and any passengers. Accordingly, stresses on the gearbox 10 can be reduced, thereby reducing wear and tear on the gearbox 10, couplings, internal gears, seals, and other components, thereby increasing longevity and reducing maintenance cycles.

Figure 3:
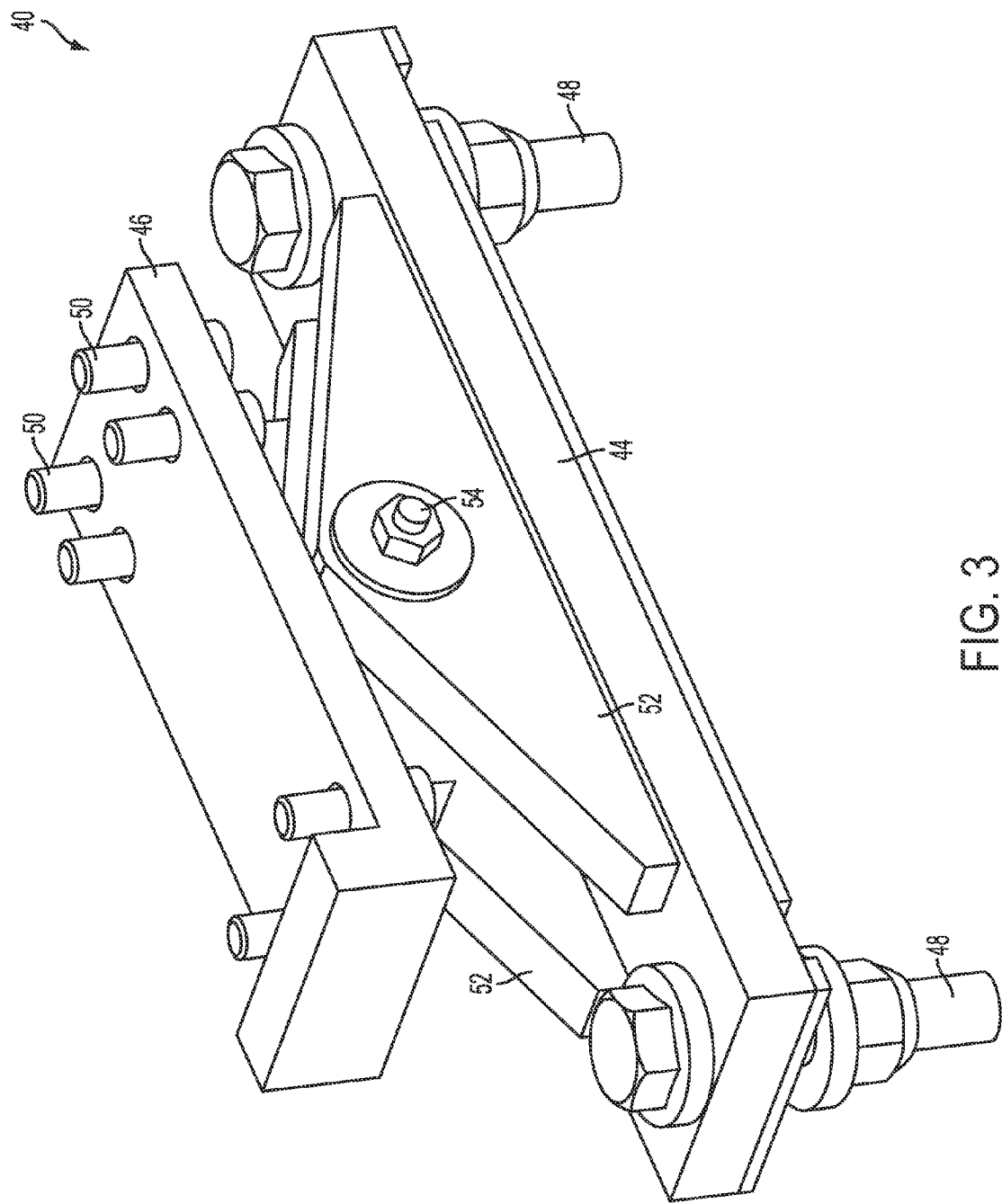
FIG. 3 is a perspective view of an embodiment of a first flexible coupling of FIG. 1.

Referring to FIG. 3, an embodiment of a first flexible coupling 40 is shown. The flexible coupling 40 can include a stationary base 44 and a coupler portion 46 that are coupled to one another in a flexible manner. For example, according to embodiments, the coupler portion 46 can pivot with respect to the stationary base 44 about one or more axes. The stationary base 44 can be adapted to mount to the structural support using various fastening techniques known in the art. For example, as shown, one or more bolts 48 mate with corresponding threaded holes on the structural support, however, other techniques such as welding, bonding, and rivets are also possible. Likewise, the coupler portion 46 can be adapted to mount to the transmission housing 12 using one or more bolts 50 or other fasteners or bonding techniques known in the art, such as welding, bonding, or rivets.

Still referring to FIG. 3, the stationary base 44 can include one or more upright flanges 52 that interconnect with the coupler portion 46. For example, a through bore can extend through the flanges 52, and can receive a shaft 54 that extends through a corresponding bore in the coupler portion 46. In FIG. 3, shaft 54 is shown as a bolt, however, other embodiments are possible. A bearing (not visible in FIG. 3) can be located on the coupler portion 46 and can receive the shaft, thereby facilitating a stable and smooth pivoting connection between the stationary base 44 and the coupler portion 46. Further details of the bearing will be described in connection with the embodiment of FIGS. 4-6. Although the bearing is located in the coupler portion 46 in FIG. 3, one or more bearings could alternatively or additionally be provided on the flanges 52 of the stationary base 44 to receive shaft 54. Furthermore, other types of flexible connections can be used instead of a pivoting hinge. For example, a living hinge, such as an elastomer or resilient plastic material can extend between the coupler portion 46 and the stationary base 44. Alternatively, the coupler portion 46 and stationary base 44 can be monolithic and define an area of reduced dimension to form a living hinge. One of ordinary skill in the art will understand based on this disclosure that other structures can be implemented to form a flexible connection between the housing 12 and the stationary base 44.

Figure 6:
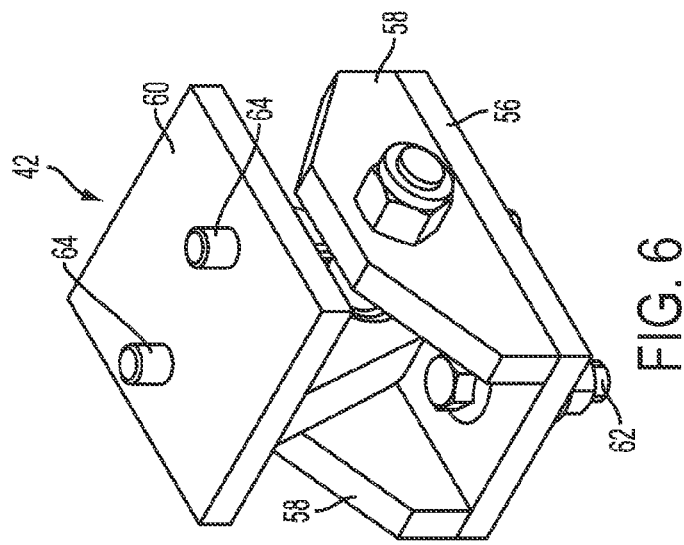
FIGS. 4, 5, and 6 are side, cross-sectional, and perspective views of an embodiment of a second flexible coupling of FIG. 1.
Figure 5:
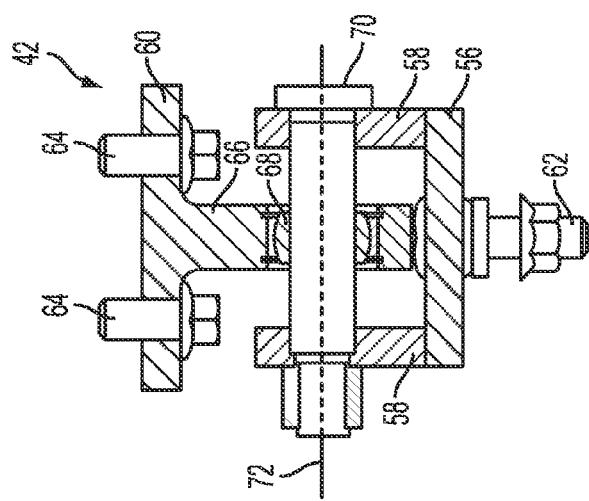
Figure 4:
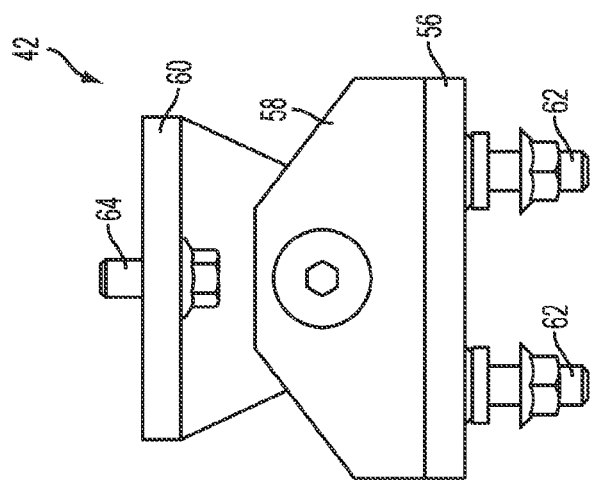

FIGS. 4, 5, and 6 depict an embodiment of a second flexible coupling 42. Second flexible coupling 42 is substantially the same as first flexible coupling 40, except for the dimensions. For example, second flexible coupling 42 can include a stationary base 56 having flanges 58, and a coupler portion 60 flexibly coupled to the stationary base 56. The stationary base 56 can attach to the support surface using bolts 62 or other fasteners or bonding techniques known in the art, such as welding, bonding, or rivets. The coupler portion 60 can likewise attach to the transmission housing 12 using bolts 64 or other fasteners or bonding techniques known in the art.

Referring specifically to FIG. 5, an exemplary embodiment of the connection between coupler portion 60 and the stationary base 56 is shown. As shown, the coupler portion 60 can include a flange 66 that supports a bearing 68 (e.g., a ball bearing, cylindrical roller bearing, spherical roller bearing), bushing, or other structure. In the embodiment shown, the bearing 68 is secured in a bore in flange via snap rings, however, other embodiments are possible. A shaft 70 can extend through a bore in flanges 58 and through the bearing 68, thereby coupling the coupler portion 60 to the stationary base 56. The coupler portion 60 can pivot with respect to the stationary base 56 about the axis 72 of shaft 70, while remaining substantially constrained in other directions. Alternatively, different types of bearings or connections can be used to provide movement of the coupler portion 60 with respect to the stationary base 56 about additional or different axes. Further, in addition to, or as an alternative to, bearings can be provided in flanges 58 to support the shaft 70.

Referring back to FIG. 1, the first flexible coupling 40 can be located on the lower wall 16 substantially in line with the main shaft 30. Additionally, the second flexible coupling 42 can be located on the lower wall 16 at a distance from the first flexible coupling 40, for example, substantially adjacent to the end wall 18, however, other locations are possible.

Referring to FIGS. 1 and 2 in conjunction, the main shaft 30 can define an axis 74 about which the main shaft 30 rotates. The first flexible coupling 40 can also define an axis 76 about which the coupler portion 46 pivots (see description of second flexible coupling 42, above). According to an embodiment, the rotation axis 74 of the main shaft 30 can be substantially parallel to the axis 74 and/or 76, allowing the flexible couplings 40, 42 to flex in response to torque applied to the transmission housing 12 by the rotating main shaft 30 when under load.

Figure 7:
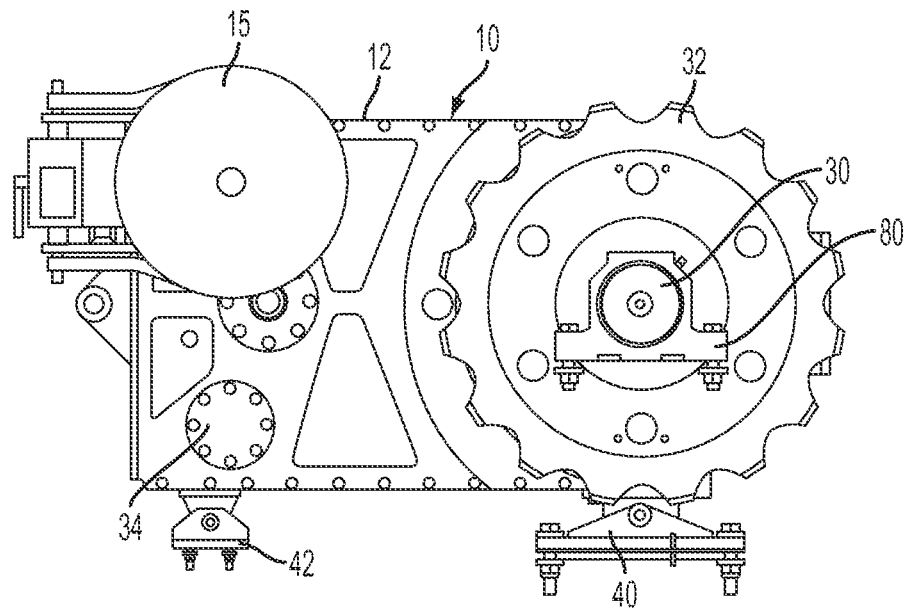
FIG. 7 is a side view of the gearbox of FIG. 1 in combination with an embodiment of a bearing block.
Figure 8:
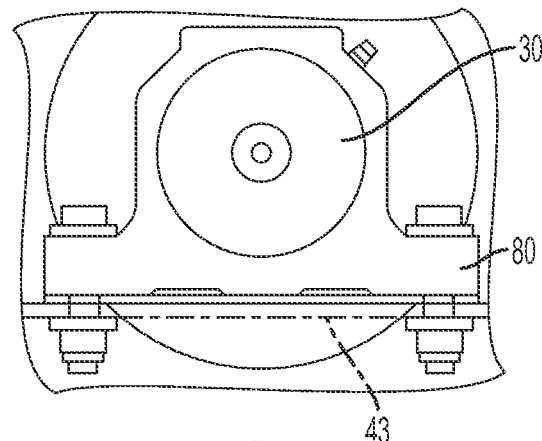
FIG. 8 is an enlarged view of a portion of FIG. 7, showing the bearing block.
Figure 9:
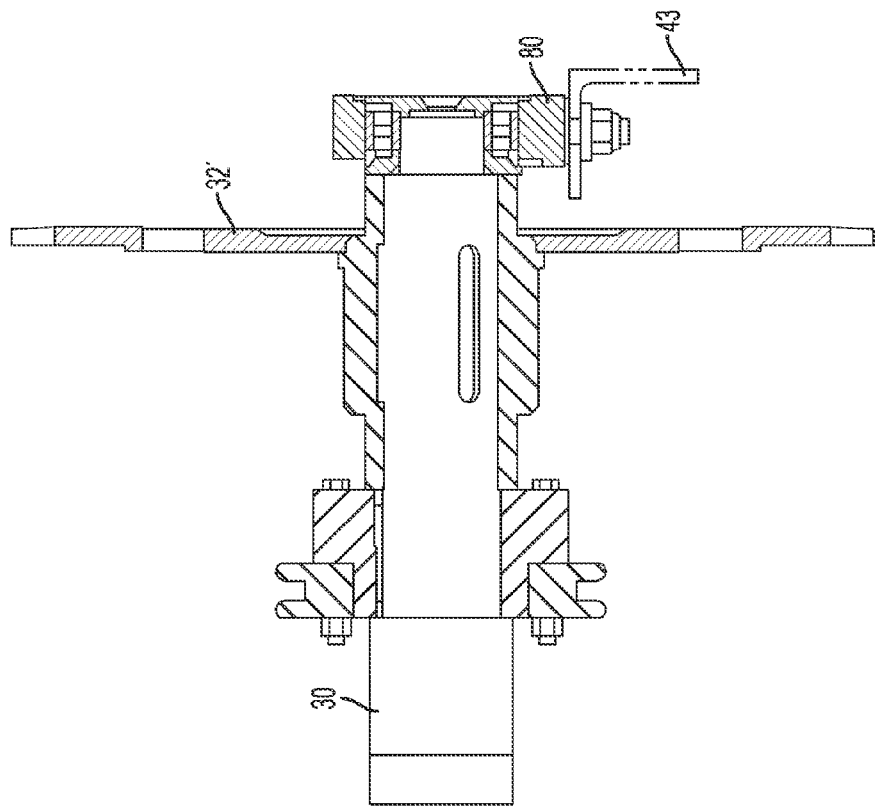
FIG. 9 is a cross-sectional view of FIG. 7.
Figure 9:
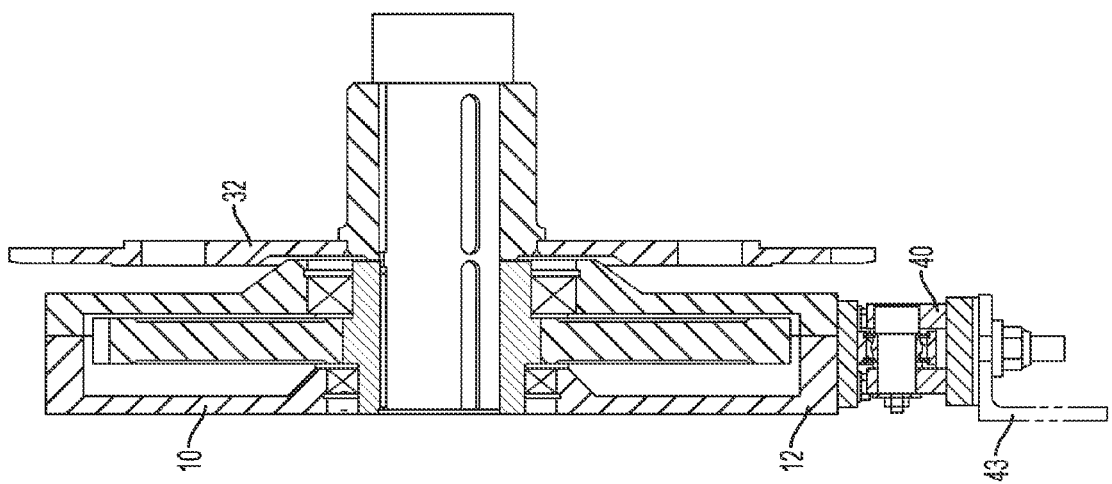

Referring to FIGS. 7 and 8, the gearbox 10 is shown in combination with a bearing block 80 supporting the opposing end of main shaft 30. According to some embodiments, two or more gearboxes 10 may be used (e.g., on substantially opposite sides of the main shaft 30), however, in other cases, the bearing block 80 may be needed to support the end of main shaft 30 not supported by the gearbox 10, for example, as shown in FIG. 9. The bearing block 80 can be secured to the structural support 43, for example, by bolts, rivets, welding, bonding, or other techniques known in the art. Although not shown in detail, the bearing block 80 can include a bearing, bushing, or other structure that receives and supports the main shaft for rotation with respect thereto. In FIG. 7, the location of the main drive motor 13 and brake mount 34 are reversed, such that the drive motor 13 is near the top of the transmission housing 12. This change may be made, for example, to meet space constraints in the particular installation.

FIG. 9 is a cross-sectional view through the gearbox 10, main shaft 30, and bearing block 80. According to non-limiting embodiments, the gearbox 10 and bearing block 80 can together support the main shaft 30 without any additional support structure for the main shaft 30. Alternatively, two or more gearboxes 10 can together support the main shaft 30 without any additional support structure for the main shaft.

One of ordinary skill in the art will appreciate from this disclosure, however, that additional supports may be used if desired. Since embodiments of gearbox 10 can support the main shaft 30 independent of the truss, there can be greater flexibility in the location of gearbox 10 allowing, for example, its placement outside of the step band (e.g., outside of sprockets 32, 32'), thereby providing ease of access for future maintenance. One of ordinary skill in the art will appreciate, however, that alternative locations of gearbox 10 are possible, including those inside the step band.

Figure 10:
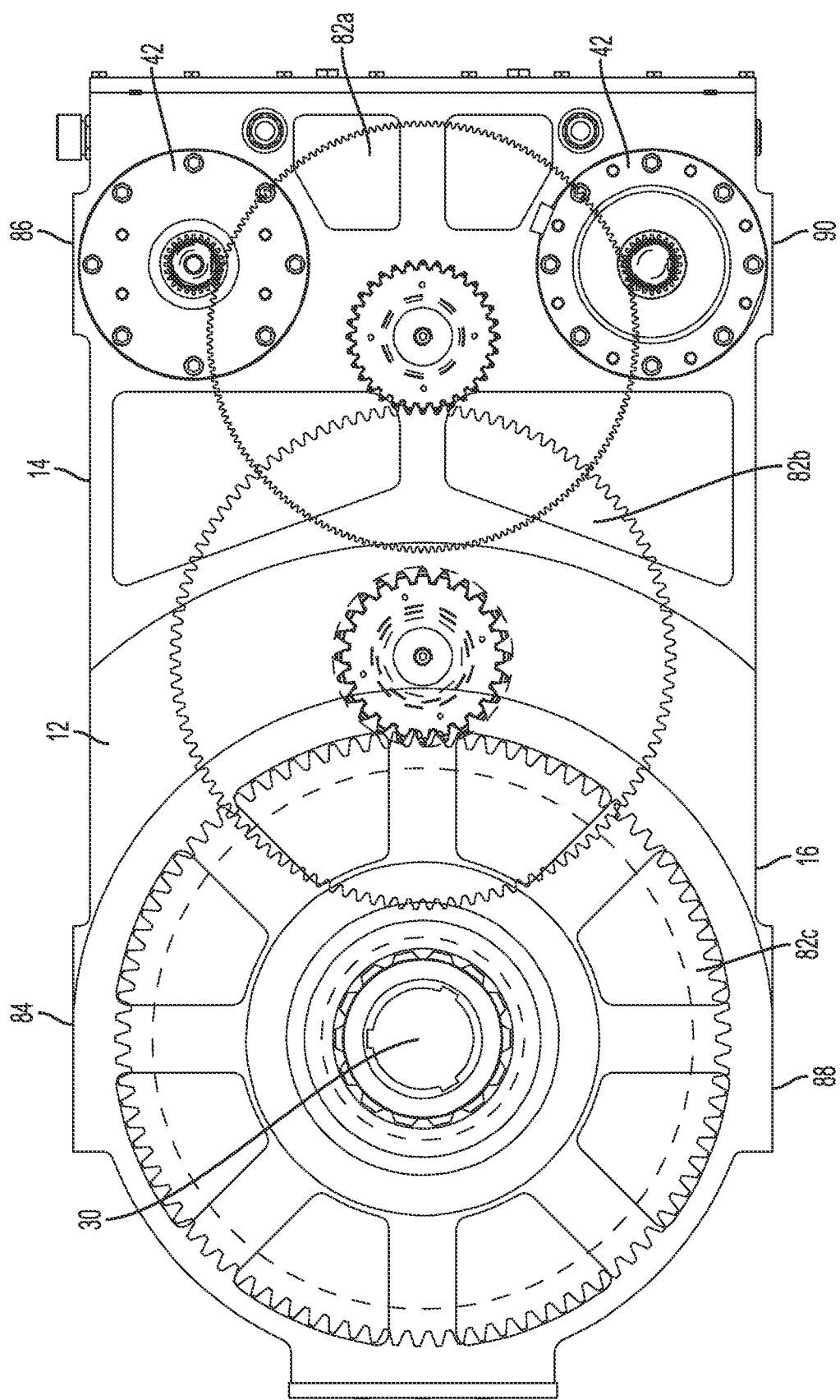
FIG. 10 is a side, internal view of the gearbox of FIG. 1, showing the internal gears.

FIG. 10 is an internal view of the transmission housing 12. The embodiment shown includes two main drive motors 42. FIG. 10 shows an embodiment of the gear train 82a, 82b, 82c that transfers rotation from the main drive motors 42 to the main shaft 30. The gear train 82a, 82b, 82c can be mounted within the transmission housing on shafts and bearings, or other structures known in the art. One of ordinary skill in the art will understand based on this disclosure that a variety of different gears and gear combinations can be used to transfer power from the main drive motor(s) to the main shaft 30 in accordance with the present invention.

Still referring to FIG. 10, embodiments of the transmission housing 12 can be substantially symmetrical from the upper wall 14 to the lower wall 16, allowing the gearbox 10 to be flipped or rotated into different positions to accommodate different installations. The upper wall 14 can include first attachment locations 84, 86 adapted to receive the flexible couplings 40, 42, respectively. Likewise, the lower wall 16 can include second attachment locations 88, adapted to receive the flexible couplings 40, 42, allowing the couplings 40, 42 to be interchangeably mounted to the upper wall 14 or lower wall 16 for different installation orientations of the gearbox 10. The attachment locations 84, 86, 88, 90 can comprise threaded bores, bores, welding flats, or other structures that facilitate attachment of the flexible couplings 40 and/or 42.

Figure 11:
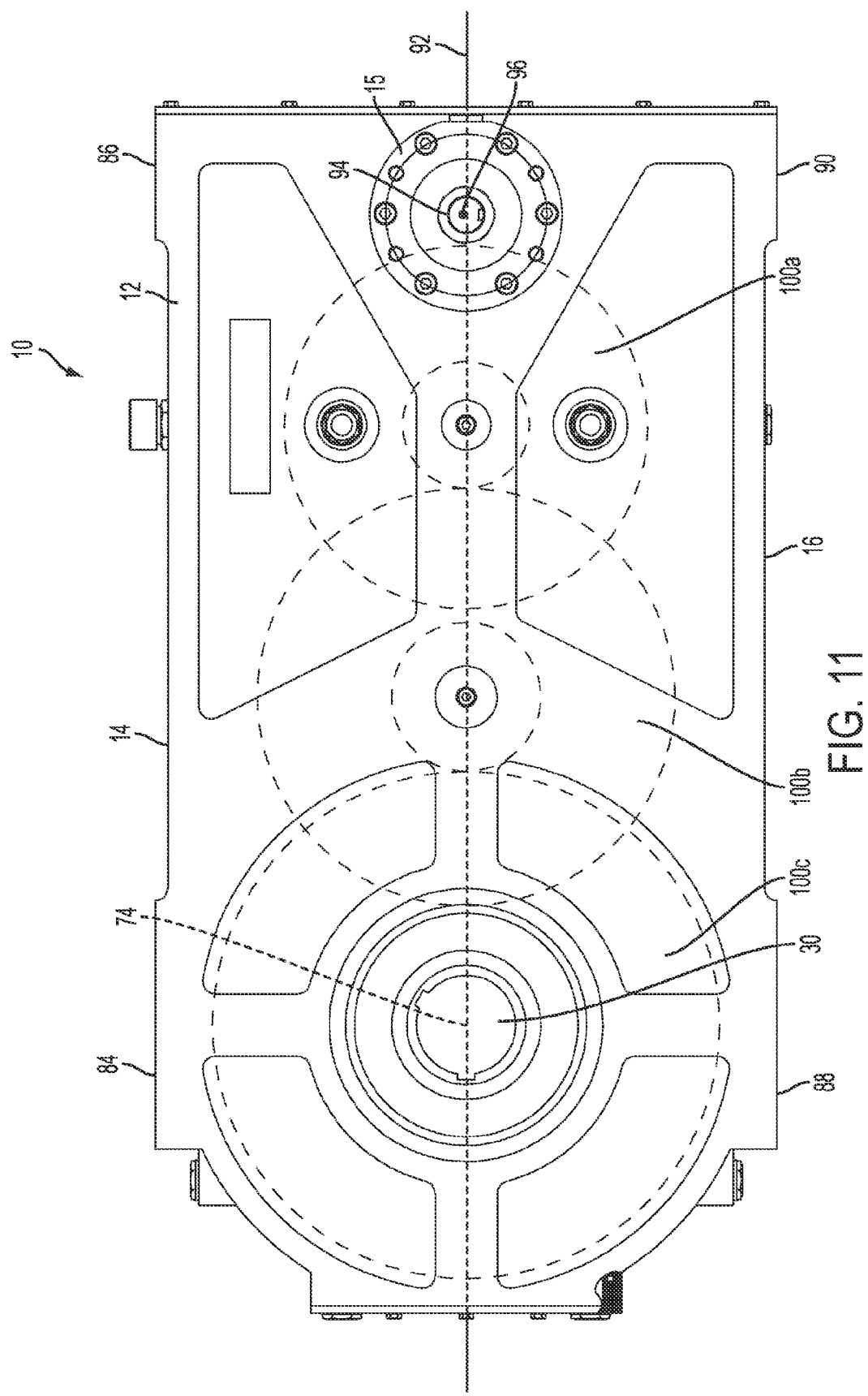
FIG. 11 is a side view of a second embodiment of a gearbox for a people mover, showing the internal gears in dashed lines.

Referring to FIG. 11, an embodiment of gearbox 10 is shown where the main drive motor 15 is mounted on the centerline 92 of the transmission housing 12. For example, the main drive motor 15 can include an output shaft 94 that defines an axis 96 that substantially intersects the centerline 92. Likewise, the axis 74 of the main shaft 30 can substantially intersect the centerline 92. This configuration can result in a gearbox 10 that is substantially symmetrical from top to bottom, providing added flexibility in the installation locations possible for the gearbox 10. FIG. 11 also shows the gear train 100a, 100b, 100c that can be used to transfer rotation from the main drive motor 42 to the main shaft 30. As described previously, the gear train 100a, 100b, 100c can be mounted within the transmission housing on shafts and bearings, or other structures known in the art. One of ordinary skill in the art will understand based on this disclosure that a variety of different gears and gear combinations can be used to transfer power from the main drive motor(s) to the main shaft 30 in accordance with the present invention.

Figure 12:
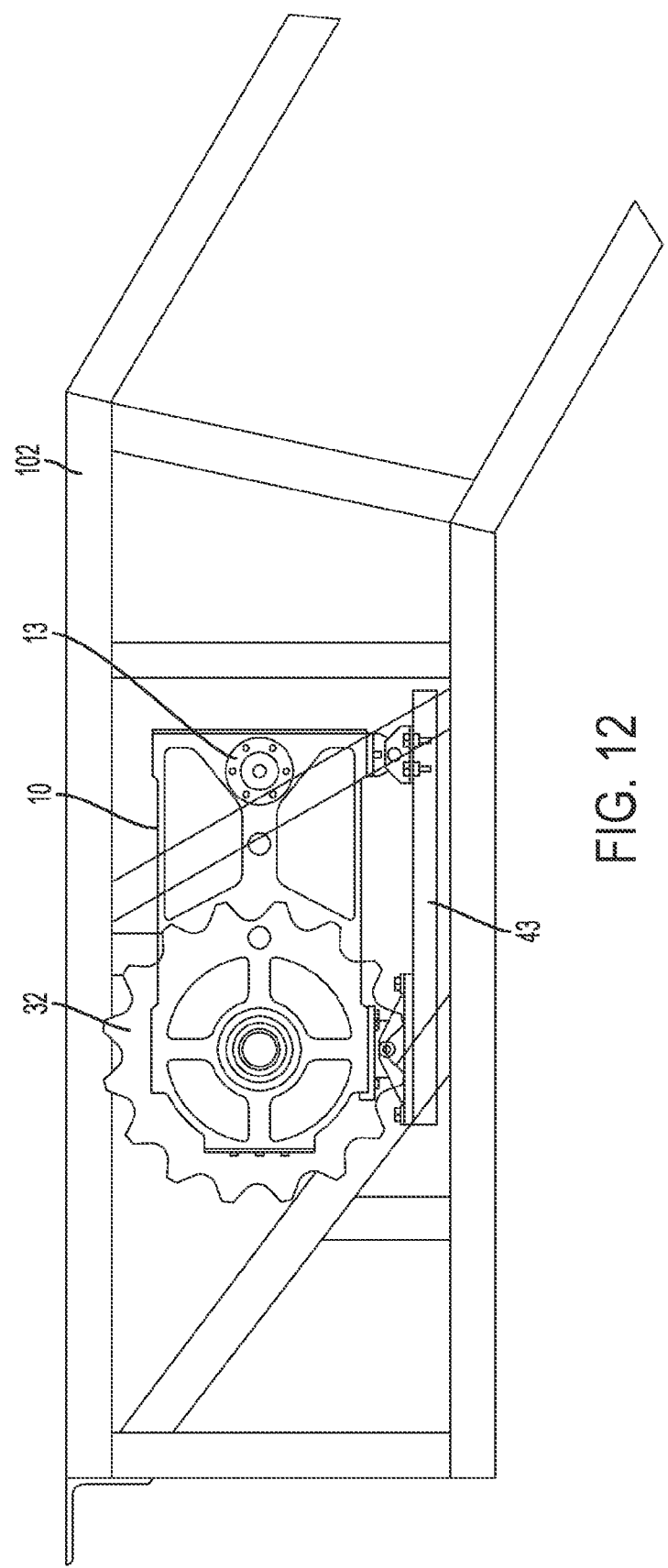
FIG. 12 is a side view of a people mover, particularly an escalator, incorporating the gearbox of FIG. 11.

FIG. 12 shows an embodiment of gearbox 10 mounted adjacent to an existing truss 102 of an escalator, for example, to structural support 43. Due to the symmetric nature of gearbox 10, it can be easily flipped front-to-back, or side-to-side, to optimize the location of sprocket 32 and/or to locate the main drive motor 13 where convenient. FIG. 12 shows gearbox 10 installed in an escalator using a truss 102. However, instead of using the truss 102 to support the main shaft 30, the gearbox 10 itself supports the main shaft 30, adding flexibility to the location of the main shaft 30, gearbox 10, and/or eliminating indirect connections between the gearbox and main shaft. As discussed previously, some applications may not use a truss at all. However, in those applications, part of the building, such as a concrete floor, will need to support the weight of the steps and passengers, e.g., on a step track.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A power transmission system for a people mover, comprising:
    a transmission housing;
    a main shaft extending at least partially through the transmission housing for rotation with respect thereto;
    a plurality of gears located inside the transmission housing, the plurality of gears adapted to rotate the main shaft; and
    a flexible coupling adapted to secure the transmission housing to a structural support, wherein the flexible coupling comprises:
    a stationary base adapted to mount to the structural support; and
    a coupler portion adapted to mount to the transmission housing;
    wherein the coupler portion is pivotably connected to the stationary base.

2. The power transmission system of claim 1, wherein the flexible coupling further comprises:
    a shaft and a bearing coupling the coupler portion to the stationary base.

3. The power transmission system of claim 2, wherein the bearing comprises a ball bearing, a cylindrical roller bearing, or a spherical roller bearing.

4. The power transmission system of claim 1, wherein the flexible coupling further comprises:
    first and second flanges located on the stationary base;
    a bearing located on the coupler portion; and
    a shaft extending through the first and second flanges and the bearing.

5. The power transmission system of claim 4, wherein the bearing comprises a ball bearing, a cylindrical roller bearing, or a spherical roller bearing.

6. The power transmission system of claim 1, wherein the main shaft rotates about a first axis, and the flexible coupling is flexible about a second axis that is substantially parallel to the first axis.

7. The power transmission system of claim 1, wherein rotation of the main shaft imparts torque on the transmission housing, and the flexible coupling is adapted to flex in the direction of the torque.

8. The power transmission system of claim 1, further comprising a second flexible coupling adapted to secure the transmission housing to the structural support.

9. The power transmission system of claim 1, further comprising a step chain sprocket mounted on the main shaft.

10. The power transmission system of claim 1, further comprising a plurality of gears inside the transmission housing, the plurality of gears transferring rotation of a main drive motor to the main shaft.

11. The power transmission system of claim 1, further comprising a bearing block adapted to mount to the structural support, wherein the transmission housing and bearing block alone support the main shaft.

12. A trussless people mover comprising the power transmission system of claim 1.

13. The trussless people mover of claim 12, further comprising a step band, wherein the transmission housing is located outside the step band.

14. The people mover of claim 1, wherein the flexible coupling comprises a bracket.

15. The people mover of claim 1, wherein the main shaft is supported by the transmission housing for rotation with respect thereto.

16. A power transmission system for a people mover, comprising:
a transmission housing;
a main shaft extending at least partially through the transmission housing for rotation with respect thereto;
a plurality of gears located inside the transmission housing, the plurality of gears adapted to rotate the main shaft; and
a flexible coupling adapted to secure the transmission housing to a structural support, wherein the transmission housing is substantially rectangular and comprises:
an upper wall defining a first attachment location; and
a lower wall defining a second attachment location;
wherein the flexible coupling is interchangeably mountable to the first attachment location or the second attachment location.

17. The power transmission system of claim 16, wherein the transmission housing defines a center line substantially intermediate the upper wall and the lower wall, and the main shaft rotates about a first axis that intersects the center line.

18. The power transmission system of claim 17, wherein the transmission housing includes a motor mount adapted to couple a main drive motor having an output axis to the transmission housing, wherein the motor mount is positioned so the output axis of the main drive motor intersects the center line of the transmission housing.

* * * * *